(12) United States Patent
Bernat et al.

(10) Patent No.: US 11,232,127 B2
(45) Date of Patent: Jan. 25, 2022

(54) TECHNOLOGIES FOR PROVIDING DYNAMIC PERSISTENCE OF DATA IN EDGE COMPUTING

(71) Applicant: Intel Corporation, Santa Clara, CA (US)

(72) Inventors: Francesc Guim Bernat, Barcelona (ES); Karthik Kumar, Chandler, AZ (US); Suraj Prabhakaran, Aachen (DE); Ramanathan Sethuraman, Bangalore (IN); Timothy Verrall, Pleasant Hill, CA (US); Ned Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 100 days.

(21) Appl. No.: 16/235,202

(22) Filed: Dec. 28, 2018

(65) Prior Publication Data
US 2019/0138534 A1     May 9, 2019

(51) Int. Cl.
*G06F 16/27*     (2019.01)
*G06F 3/06*     (2006.01)

(52) U.S. Cl.
CPC ............ *G06F 16/27* (2019.01); *G06F 3/067* (2013.01)

(58) Field of Classification Search
CPC ........................................ G06F 16/27
USPC ........................................ 707/802
See application file for complete search history.

(56) References Cited

U.S. PATENT DOCUMENTS

| | | | | |
|---|---|---|---|---|
| 8,060,473 | B1* | 11/2011 | Dhumale | G06F 11/1464 707/640 |
| 8,849,756 | B2* | 9/2014 | Kim | H04L 67/1095 707/634 |
| 9,912,752 | B1* | 3/2018 | Davis | H04L 67/1097 |
| 10,810,093 | B1* | 10/2020 | Tucek | H04L 41/0806 |
| 2006/0121909 | A1* | 6/2006 | Welsh | H04W 24/10 455/450 |
| 2008/0288458 | A1* | 11/2008 | Sun | H04L 67/1097 |
| 2011/0099266 | A1* | 4/2011 | Calder | G06F 8/65 709/224 |
| 2017/0257433 | A1* | 9/2017 | Rosa | H04L 12/4625 |
| 2018/0295036 | A1* | 10/2018 | Krishnamurthy | G06F 9/45558 |
| 2019/0279082 | A1* | 9/2019 | Moloney | G06N 3/0454 |
| 2020/0089424 | A1* | 3/2020 | Klein | G06F 3/0649 |
| 2020/0110403 | A1* | 4/2020 | Antich | H04W 4/44 |
| 2020/0133554 | A1* | 4/2020 | Kishi | G06F 3/0647 |
| 2020/0134198 | A1* | 4/2020 | Rudrabhatla | G06F 3/0623 |

* cited by examiner

*Primary Examiner* — Syling Yen
(74) *Attorney, Agent, or Firm* — Hanley, Flight & Zimmerman, LLC

(57) ABSTRACT

Technologies for providing dynamic persistence of data in edge computing include a device including circuitry configured to determine multiple different logical domains of data storage resources for use in storing data from a client compute device at an edge of a network. Each logical domain has a different set of characteristics. The circuitry is also to configured to receive, from the client compute device, a request to persist data. The request includes a target persistence objective indicative of an objective to be satisfied in the storage of the data. Additionally, the circuitry is configured to select, as a function of the characteristics of the logical domains and the target persistence objective, a logical domain into which to persist the data and provide the data to the selected logical domain.

30 Claims, 9 Drawing Sheets

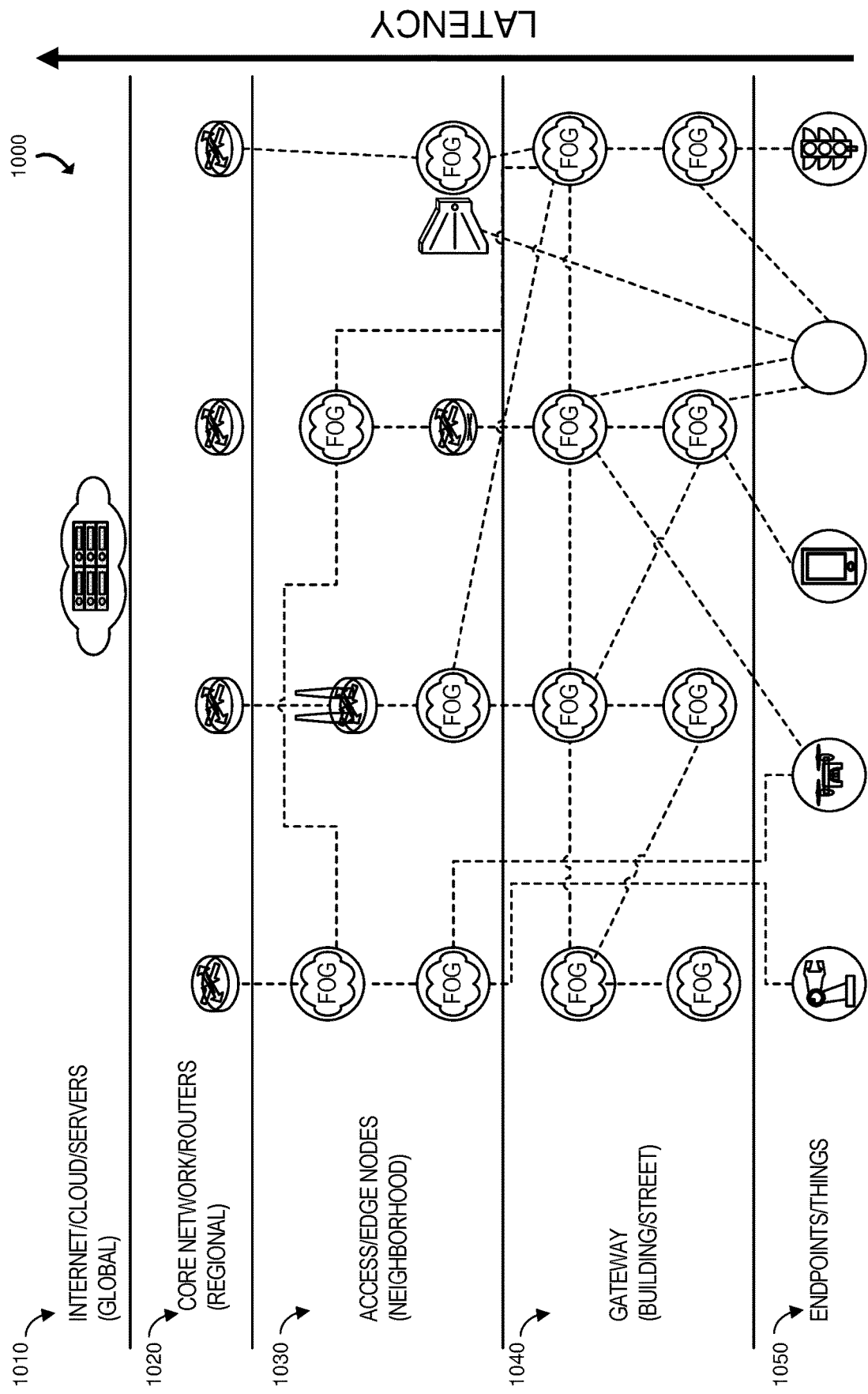

TECHNOLOGIES FOR PROVIDING DYNAMIC PERSISTENCE OF DATA IN EDGE COMPUTING

BACKGROUND

Edge computing is a new paradigm in which compute and memory resources are situated at base stations or other locations along an edge between endpoint devices and traditional mobile network access points, in order to meet low latency requirements. The volumes of data transmitted at the edge can span terabytes in relatively short intervals of time. As a simple illustration, a single autonomous car may send one terabyte of data every two hours. Additionally, sensor data from thousands of sensors, surveillance video feeds, images, data from drones (e.g., unmanned aerial vehicles), and/or other endpoint devices, may be sent to the edge, resulting in a significant volume of data to be managed. Different applications may have different latency requirements pertaining to data storage. For example, machine-to-machine communications, such as car or drone communications have significantly more demanding latency requirements than smart homes. Even within an application, there may be key differences in data requirements. For example, drones may send different types of data, some of which may need to be processed faster than others. Further, as conditions of an endpoint device change over time, the data-related latency requirements of the endpoint device may change. For example, the endpoint device may need data to be stored at the edge sooner if the endpoint device is running low on available memory (e.g., in order to free up a portion of the memory) than if the endpoint device has a larger amount of free memory.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 10 is a simplified block diagram of a fog and mobile edge computing (MEC) network topology that may be utilized with the system of FIG. 1.

DETAILED DESCRIPTION OF THE DRAWINGS

Figure 1:
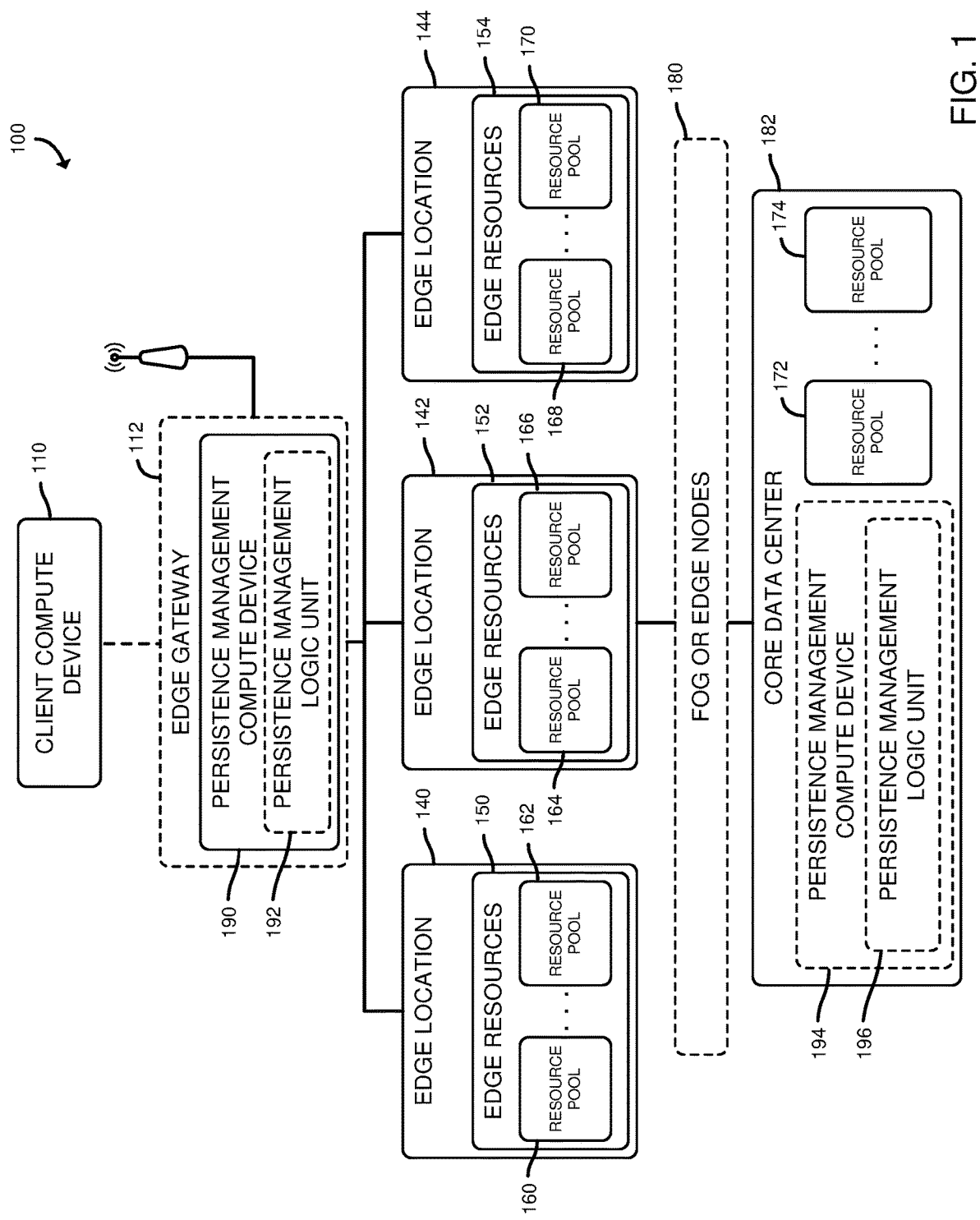
FIG. 1 is a simplified diagram of at least one embodiment of a system for providing dynamic persistence of data in edge computing.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for providing dynamic persistence of data in edge computing includes a client compute device 110 in communication with a persistence management compute device 190. The persistence management compute device 190 may be embodied as any compute device capable determining multiple different logical domains (e.g., groupings, each having different characteristics from each other, such as reliability, latency, and/or cost) of data storage resources for use in storing data from a client compute device (e.g., the client compute device 110) at an edge of a network, receiving a request from the client compute device 110 to persist (e.g., store) data based on one or more target persistence objectives (e.g., objective(s) to be satisfied in the storage of the data, such as a level of reliability to be provided, a latency with which to store the data, and/or a cost for storing the data), selecting one or more of the logical domains for storage of the data based on the characteristics of the different logical domains and the target persistence objective(s), and providing the data to the selected logical domain(s). As such, as compared to typical data storage systems for edge computing, the system 100 provides dynamic (e.g., customizable) persistence of data to suit the needs of client devices at the edge (e.g., to provide high reliability and low latency persistence at a relatively high cost in response to one request, and to provide a different level of reliability, latency, and/or cost in response to other request(s)).

In the illustrative embodiment, the persistence management compute device 190 includes a persistence management logic unit 192 which may be embodied as any device and/or circuitry (e.g., a co-processor, an application specific integrated circuit (ASIC), a field programmable gate array (FPGA), etc.) configured to perform one or more of the operations of the persistence management compute device 190 described above (e.g., by offloading those functions from a general purpose processor). By implementing the functions in dedicated hardware (e.g., the persistence management logic unit 192), the persistence management compute device 190 may perform the selection of an appropriate logical domain in response to a given request more efficiently (e.g., faster, with lower power usage, etc.) than if the functions were implemented in software executed by a general purpose processor. The persistence management compute device 190 may be located in an edge gateway 112, which may be embodied as any device capable of communicating data between the client compute device 110 and one or more sets of edge resources 150, 152, 154 (e.g., resources, such as data storage resources, compute resources, etc. owned and/or operated by one or more service providers, such as cellular network operators) or other compute devices located in a cloud across edge locations 140, 142, 144 (e.g., base stations, small cells, etc.).

The edge gateway 112 and the persistence management compute device 190 may be located in an edge location (e.g., a base station). The resources may be organized into pools 160, 162, 164, 166, 168, 170 (e.g., physical or logical sets of resources of different types, such as sets of multiple data storage devices, sets of compute devices, sets of memory devices, etc.). Resources from one or more of the pools 160, 162, 164, 166, 168, 170 may define a logical domain. Similarly, a core data center 182 (e.g., a data center that is further away from and in a higher level of a hierarchy of the system 100 than the edge resources 150, 152, 154), also referred to herein as a central office, located at the core of a cloud, may include a persistence management compute device 194 and a corresponding persistence management logic unit 196 to select from resources in resources pools 172, 174 located at the core data center 182 to persist data provided by the client compute device 110. More specifically, one or more of the resources in the resource pools 172, 174 at the core data center 182 may be included in the logical domains described above.

Figure 7:
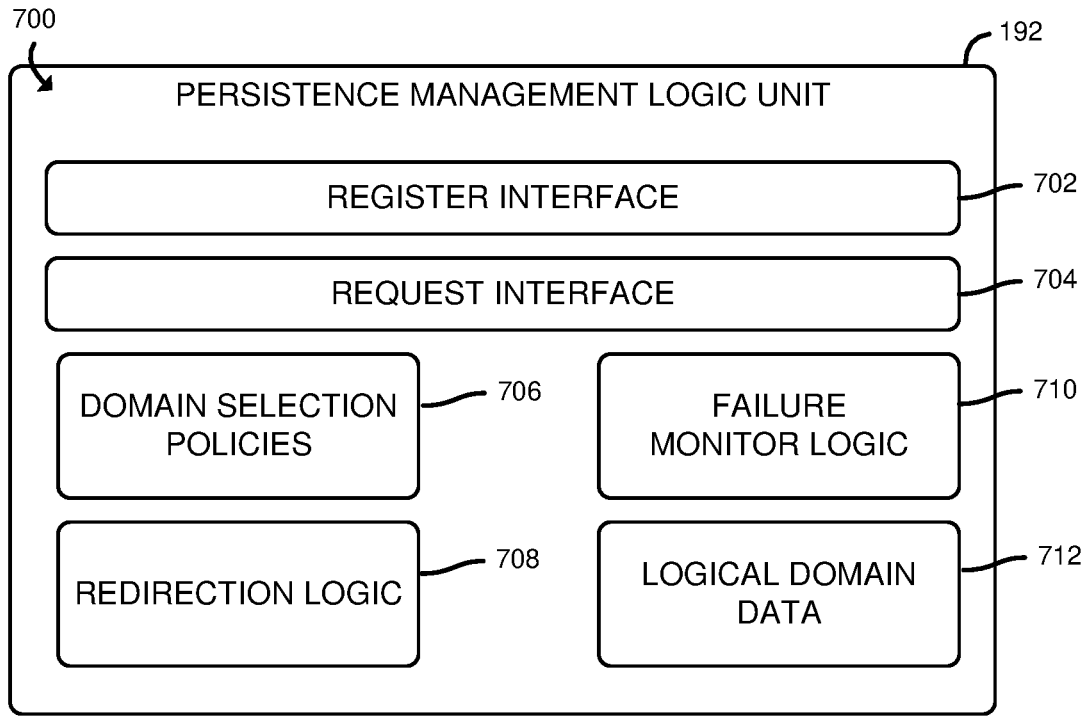
FIG. 7 is a simplified block diagram of at least one embodiment of a set of logical components of a persistence management logic unit included in the persistence management compute device of FIG. 1.

Referring briefly to FIG. 7, the persistence management logic unit 192, in operation, may establish a set of logical components (e.g., groups of related functions) 700. The set 700 includes a register interface 702 which includes functions executed by the persistence management logic unit 192 to respond to requests from other resources to register characteristics of the resources (e.g., reliability characteristics, such as information about the type of data storage media used by a data storage device, a type of error correction algorithm used by a data storage device, latency characteristics, such as an amount of time typically taken by a data storage device to access data, and cost characteristics, such as an amount of money charged by an owner/operator of the resource for use of that resource (e.g., a fraction of a dollar per megabyte written to or read from a data storage device, etc.)). The set 700 also includes a request interface 704 which includes functions to enable an edge device (e.g., the client compute device 110) to submit a request to have a set of data persisted and to specify a set of target persistence objectives. The set 700 also includes domain selection policies 706, which may be embodied as rules and functions for selecting a particular logical domain or combination of logical domains to satisfy a requested set of target persistence objectives. Additionally, the set 700 includes redirection logic 708 which may be embodied as functions for redirecting access of an edge device (e.g., the client compute device 110) to data that is locally stored (e.g., because the data is being cached, because the data has not yet reached its final destination (e.g., the core data center 182), or because the local storage is the final destination). Similarly, the redirection logic 708 tracks when the data has reached its final destination (e.g., by receiving a call back from the final destination, such as from the core data center 182 or an edge location 140, 142, 144) and, in response, may clean out (e.g., delete) the data from local data storage. Additionally, the set 700 includes failure monitor logic 710, which may be embodied as functions for tracking failures of resources (e.g., failures of data storage resources) and adjusting stored reliability characteristics of those resources accordingly. Further, the set 700 includes logical domain data 712 which may be embodied as any data defining groups of resources based on sets of characteristics (e.g., reliability, latency, cost) that those resources provide.

Figure 8:
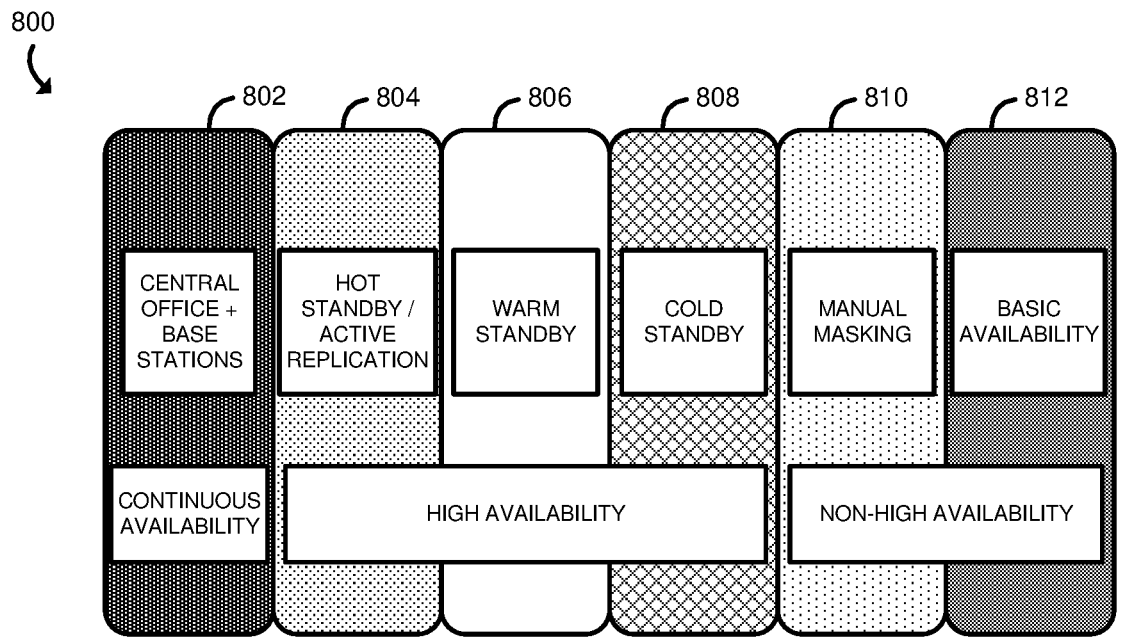
FIG. 8 is a simplified block diagram of a set of logical domains of resources usable to store data from a client compute device in the system of FIG. 1.
Figure 9:
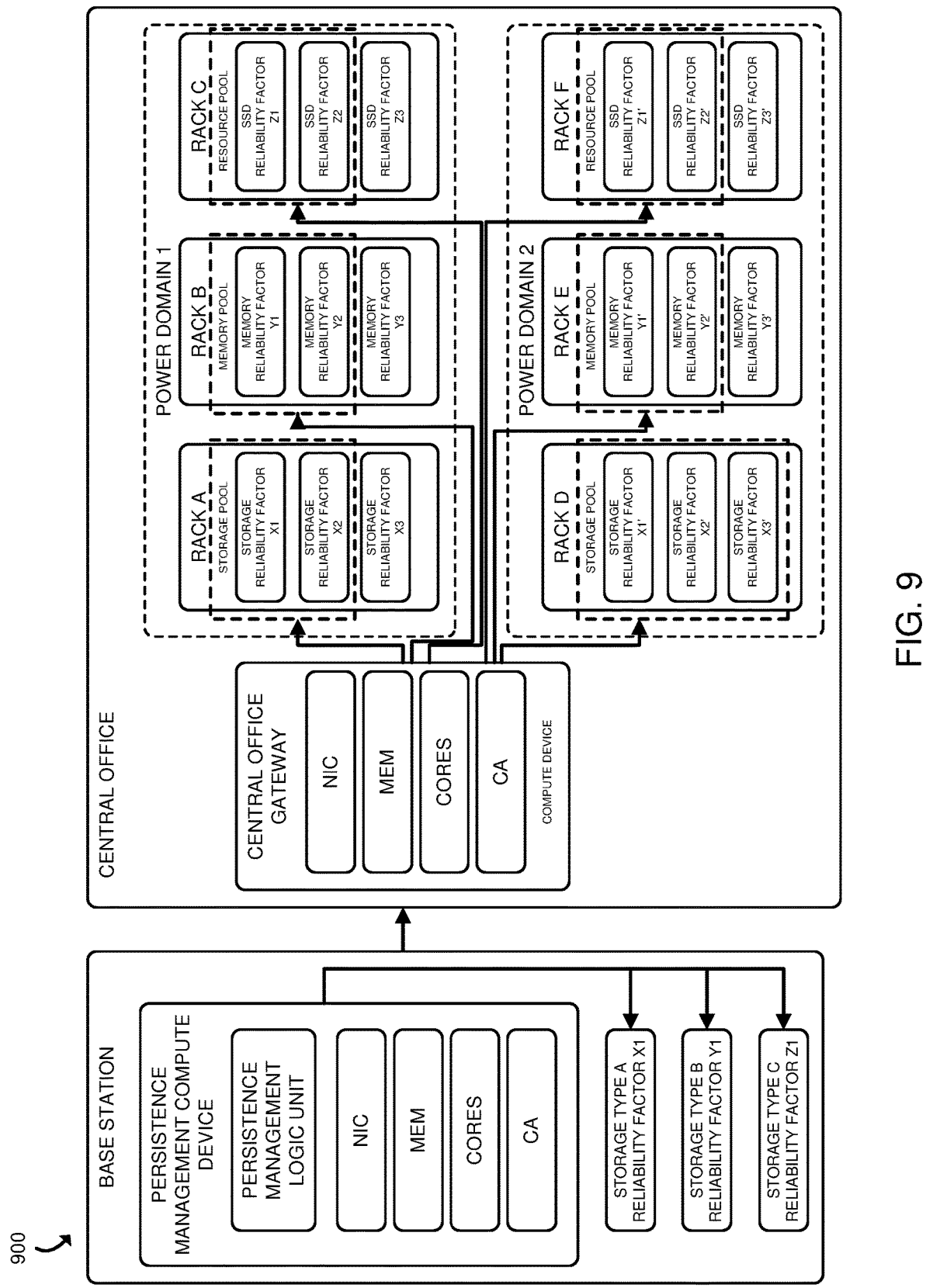
FIG. 9 is a simplified block diagram of an architecture of pools of resources of the system of FIG. 1 having varying reliability characteristics.

Referring briefly to FIG. 8, a set 800 of logical domains 802, 804, 806, 808, 810, 812, each having different characteristics, are shown. The logical domains 802, 804, 806, 808, 810, 812, in the illustrative embodiment, are arranged in a continuum of levels of availability (e.g., amount of time that the resources in the corresponding logical domain are available (e.g., operational) to provide a service, such as data storage), which is a function of their reliability characteristics (e.g., higher reliability results in higher availability, etc.). At one end of the set 800, the logical domain 802 provides continuous availability and includes resources of the central office (the core data center 182) and one or more base stations (e.g., edge locations 140, 142, 144). At the other end of the set 800, the logical domain 812 provides basic availability (e.g., using only the resources in a single location). FIG. 9 illustrates an architecture 900 in which different pools of resources have different reliability characteristics (e.g., reliability factors) which may be used in defining different logical domains.

As referenced above, the client compute device 110, the edge gateway 112, the persistence management compute device 190, and the and the edge resources 150, 152, 154, in the illustrative embodiment, are positioned at one or more locations (e.g., in small cell(s), base station(s), etc.) along the edge (e.g., in an edge network) of a cloud. An edge network may be embodied as any type of network that provides edge computing and/or storage resources which are proximately located to radio access network (RAN) capable endpoint devices (e.g., mobile computing devices, Internet of Things (IoT) devices, smart devices, etc.). In other words, the edge network is located at an "edge" between the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Accordingly, the edge network can provide a radio access interface to enterprise applications (e.g., housed in a remote cloud, data center, etc.) and/or other network-based services, as well as bring storage/compute resources closer to the endpoint devices. As some computations/processing can be performed at the edge networks, efficiencies such as reduced latency, bandwidth, etc., can be realized (i.e., relative to such computations/processing being performed at a remote cloud, data center, etc.). Depending on the intended purpose/capabilities of the edge network, the edge network may include one or more edge computing devices, which may include one or more gateways, servers, mobile edge computing (MEC) appliances, etc. It should be appreciated that, in some embodiments, the edge network may form a portion of or otherwise provide an ingress point into a fog network (e.g., fog nodes 180), which may be embodied as a system-level horizontal architecture that distributes resources and services of computing, storage, control and networking anywhere between the core data center 182 and an endpoint device (e.g., the client compute device 110).

Figure 2:
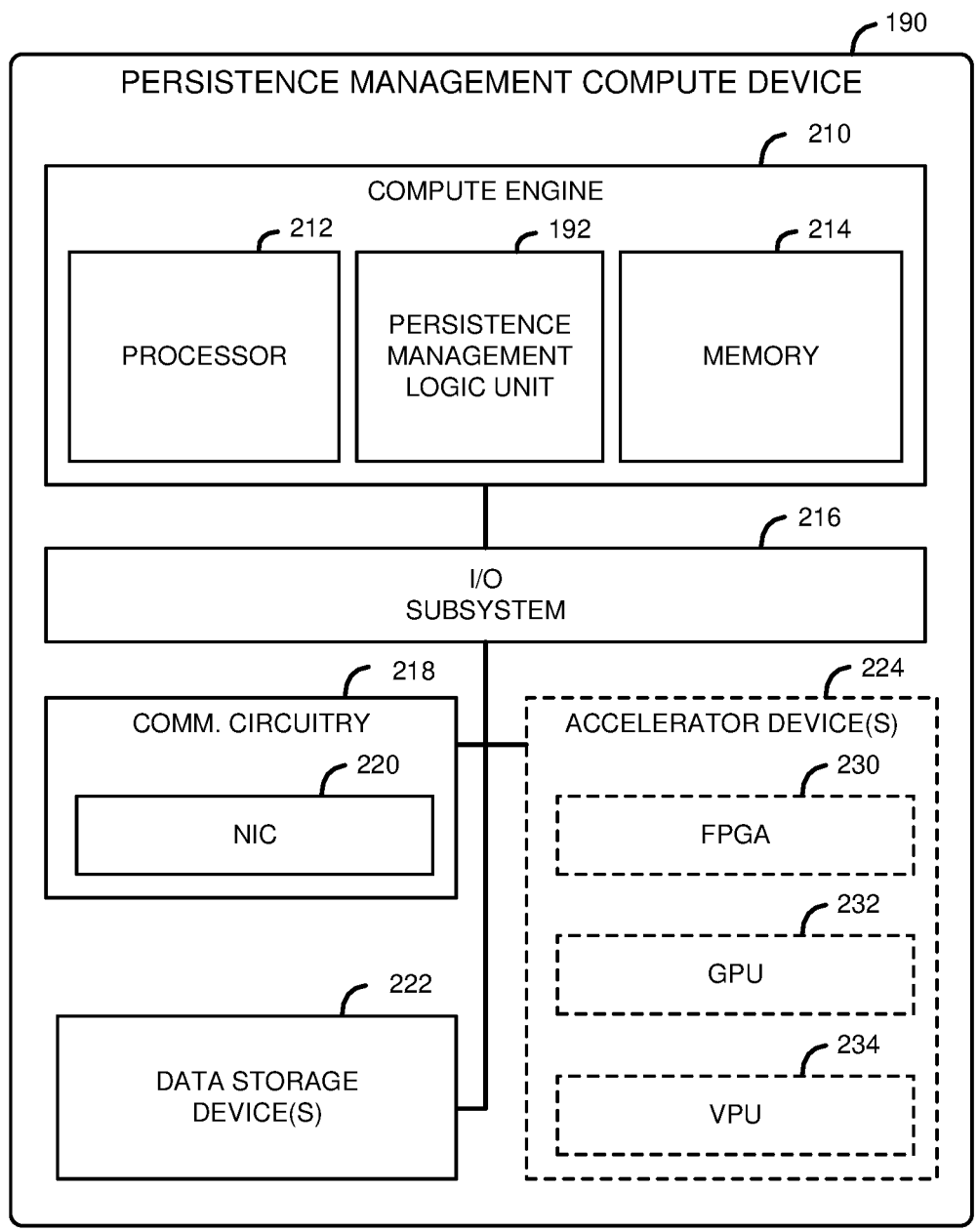
FIG. 2 is a simplified block diagram of at least one embodiment of a persistence management compute device included in the system of FIG. 1.

Referring now to FIG. 2, the illustrative persistence management compute device 190 includes a compute engine (also referred to herein as "compute engine circuitry") 210, an input/output (I/O) subsystem 216, communication circuitry 218, and one or more data storage devices 222. As described herein, the persistence management compute device 190 may also include one or more accelerator devices 224. Of course, in other embodiments, the client compute device 110 may include other or additional components, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as a processor 212, a memory 214, and the persistence management logic unit 192, described above with reference to FIG. 1. The processor 212 may be embodied as any type of processor capable of performing the functions described herein. For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 214 may be integrated into the processor 212. In operation, the main memory 214 may store various software and data used during operation such as one or more applications, data operated on by the application(s), libraries, and drivers.

The compute engine 210 is communicatively coupled to other components of the persistence management compute device 190 via the I/O subsystem 216, which may be embodied as circuitry and/or components to facilitate input/output operations with the compute engine 210 (e.g., with the processor 212 and/or the main memory 214) and other components of the persistence management compute device 190. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the persistence management compute device 190, into the compute engine 210.

The communication circuitry 218 may be embodied as any communication circuit, device, or collection thereof, capable of enabling communications over a network between the persistence management compute device 190 and another compute device (e.g., the edge gateway 112, the edge resources 150, 152, 154, etc.). The communication circuitry 218 may be configured to use any one or more communication technology (e.g., wired or wireless communications) and associated protocols (e.g., a cellular networking protocol, Wi-Fi®, WiMAX, Ethernet, Bluetooth®, etc.) to effect such communication.

The illustrative communication circuitry 218 includes a network interface controller (NIC) 220, which may also be referred to as a host fabric interface (HFI). The NIC 220 may be embodied as one or more add-in-boards, daughter cards, network interface cards, controller chips, chipsets, or other devices that may be used by the persistence management compute device 190 to connect with another compute device (e.g., the edge gateway 112, the edge resources 150, 152, 154, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the persistence management compute device 190 at the board level, socket level, chip level, and/or other levels.

The one or more illustrative data storage devices 222 may be embodied as any type of devices configured for short-term or long-term storage of data such as, for example, memory devices and circuits, memory cards, hard disk drives, solid-state drives, or other data storage devices. Each data storage device 222 may include a system partition that stores data and firmware code for the data storage device 222. Each data storage device 222 may also include one or more operating system partitions that store data files and executables for operating systems.

Each accelerator device 224 may be embodied as any device or circuitry configured to execute a set of operations faster than the processor 212 is capable of executing the operations. The accelerator device(s) 224 may include one or more field programmable gate arrays (FPGAs) 230, each of which may be embodied as a set (e.g., a matrix) of logic gates that can be configured to perform a set of operations according to a defined configuration (e.g., a bit stream). The accelerator device(s) 224 may additionally or alternatively include a graphics processing unit (GPU) 232, which may be embodied as any device or circuitry (e.g., a programmable logic chip, a processor, etc.) configured to perform graphics-related computations (e.g., matrix multiplication, vector operations, etc.). Additionally or alternatively, the accelerator device(s) 224 may include a vision processing unit (VPU) 234, which may be embodied as any device or circuitry (e.g., a programmable logic chip, a processor, etc.) configured to perform operations related to machine vision, machine learning, and artificial intelligence. Additionally or alternatively the accelerator device(s) 224 may include other types of devices, such as one or more application specific integrated circuits (ASICs). While the persistence management logic unit 192 is shown as being incorporated into the compute engine 210, in some embodiments, the persistence management logic unit 192 may be included as or implemented by an accelerator device 224.

The resource pools 160, 162, 164, 166, 168, 170, 172, 174, the edge gateway 112, the fog nodes 180, the core data center 182, and the persistence management compute device 194 may have components similar to those described in FIG. 2 with reference to the persistence management compute device 190. The description of those components of the persistence management compute device 190 is equally applicable to the description of components of the resource pools 160, 162, 164, 166, 168, 170, 172, 174, the edge gateway 112, the fog nodes 180, the core data center 182, and the persistence management compute device 194, with the exception that, in some embodiments, the persistence management logic unit 192 is not included in devices other than the persistence management compute device 190 and the persistence management compute device 194 (e.g., as the persistence management logic unit 196). Further, it should be appreciated that any of the resource pools 160, 162, 164, 166, 168, 170, 172, 174, the edge gateway 112, the fog nodes 180, the core data center 182, and the persistence management compute device 194 may include other components, sub-components, and devices commonly found in a computing device, which are not discussed above in reference to the persistence management compute device 190 and not discussed herein for clarity of the description. Further, it should be understood that one or more components of a compute device may be distributed across any distance, and are not necessarily housed in the same physical unit.

The client compute device 110, the persistence management compute device 190, the resource pools 160, 162, 164, 166, 168, 170, 172, 174, the edge gateway 112, the fog nodes 180, the core data center 182, and the persistence management compute device 194 are illustratively in communication via a network, which may be embodied as any type of wired or wireless communication network, including global networks (e.g., the Internet), local area networks (LANs) or wide area networks (WANs), an edge network, a fog network, cellular networks (e.g., Global System for Mobile Communications (GSM), 3G, Long Term Evolution (LTE), Worldwide Interoperability for Microwave Access (WiMAX), etc.), a radio access network (RAN), digital subscriber line (DSL) networks, cable networks (e.g., coaxial networks, fiber networks, etc.), or any combination thereof.

Figure 3:
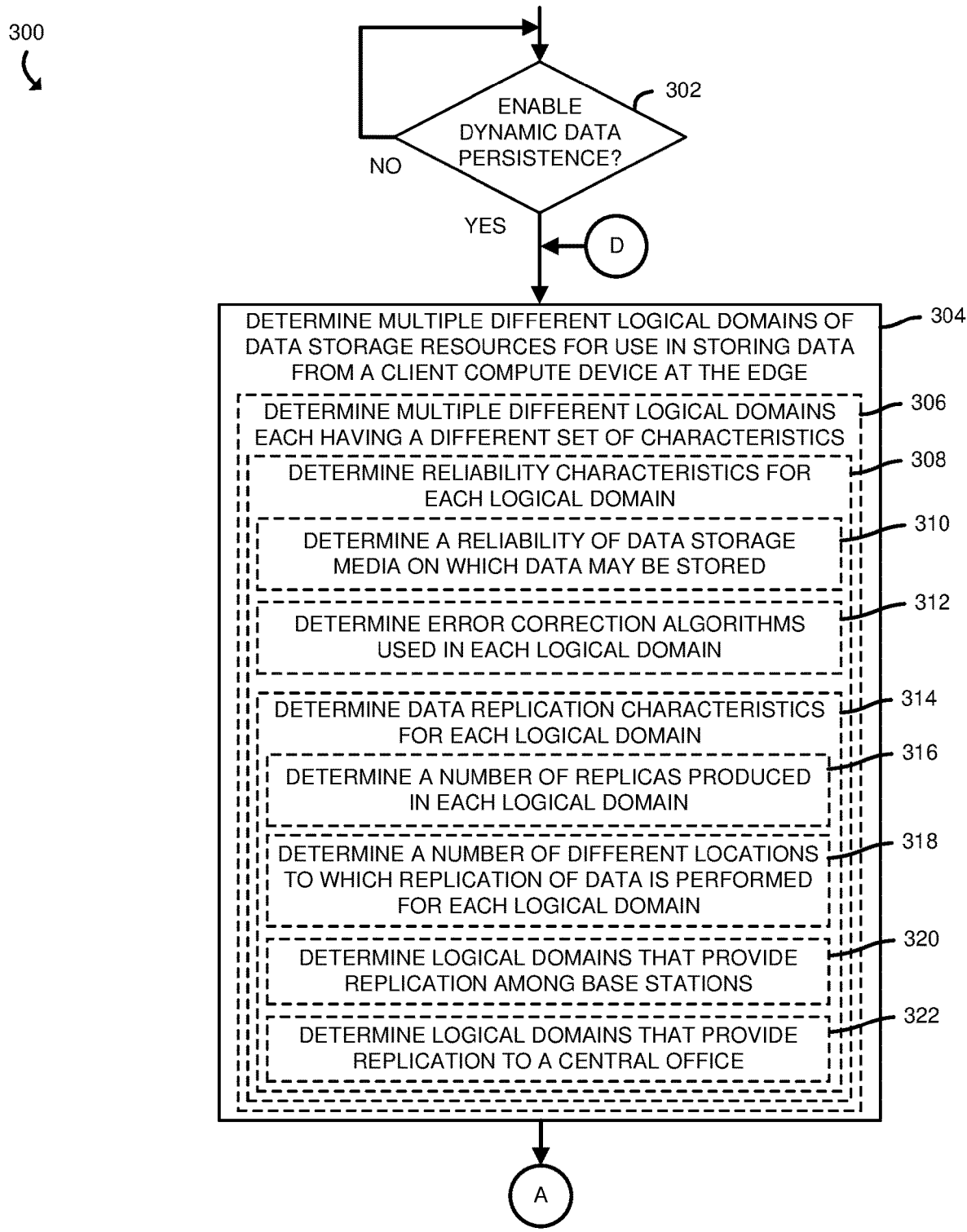
FIGS. 3-6 are a simplified block diagram of at least one embodiment of a method for providing dynamic persistence of data for edge computing that may be performed by the persistence management compute device of FIG. 1.

Referring now to FIG. 3, the persistence management compute device 190, in operation, may execute a method 300 for providing dynamic persistence of data for edge computing. The method 300 begins with block 302, in which the persistence management compute device 190 determines whether to enable dynamic data persistence (e.g., whether to enable storing data in a logical domain selected based on a set of target storage objectives from a client compute device at the edge). In the illustrative embodiment, the persistence management compute device 190 may determine to enable dynamic data persistence if the persistence management compute device 190 is equipped with the persistence management logic unit 192, in response to determining that a configuration setting (e.g., stored in a configuration file in a data storage device 222) indicates to enable dynamic data persistence, and/or based on other factors. Regardless, in response to a determination to enable dynamic data persistence, the method 300 advances to block 304 in which the persistence management compute device 190 determines multiple different logical domains of data storage resources (e.g., the logical domains 802, 804, 806, 808, 810, 812 made up of resources from the resource pools 160, 162, 164, 166, 168, 170, 172, 174) for use in storing data from a client compute device (e.g., the client compute device 110) at the edge. In doing so, and as indicated in block 306, the persistence management compute device 190 determines multiple different logical domains each having a different set of characteristics. For example, the persistence management compute device 190 may analyze information about each resource that was submitted to the persistence management compute device 190 (e.g., through the register interface 702 of FIG. 7) to determine the characteristics of the available resources and define the logical domains. In the illustrative embodiment, the persistence management compute device 190 determines reliability characteristics for each logical domain, as indicated in block 308. As indicated in block 310, in doing so, the persistence management compute device 190 may determine a reliability of the data storage media on which data may be stored for each data storage resource associated with a given logical domain (e.g., assigning data storage resources having more reliable data storage media to a logical domain associated with a higher reliability, such as the logical domain 802, and assigning data storage resources having less reliable storage media to other logical domains). Similarly, as indicated in block 312, the persistence management compute device 190 may determine error correction algorithms to be associated with each logical domain (e.g., assigning data storage resources that utilize more robust error correction algorithms to logical domains associated with higher reliability and assigning data storage resources with less robust or no error correction algorithms to logical domains associated with lower reliability).

As indicated in block 314, the persistence management compute device 190, in determining the reliability characteristics, may determine data replication characteristics for each logical domain. In doing so, the persistence management compute device 190 may determine, for each logical domain, a number of replicas of a set of data to be produced within the logical domain, as indicated in block 316. As such, the persistence management compute device 190 may associate a logical domain associated with high reliability with a comparatively higher number of replicas than a logical domain with a lower reliability. The persistence management compute device 190 may also determine a number of different locations to which replication of data is performed for each logical domain, as indicated in block 318. As such, a logical domain in which two replicas are made in separate locations (e.g., separate power domains, separate base stations, etc.) may be associated with a higher level of reliability than a logical domain in which two replicas are produced in the same location (e.g., in the same power domain, in same base station, etc.). Similarly, the persistence management compute device 190 may determine logical domains that provide replication among base stations (e.g., multiple edge locations 140, 142, 144), as indicated in block 320. Further, the persistence management compute device 190 may determine logical domains that provide replication to the central office (e.g., the core data center 182), as indicated in block 322. As indicated in FIG. 8, the logical domain 802, which is associated with the highest reliability (e.g., highest availability) provides replication to base stations and to the central office (e.g., the core data center 182). Subsequently, the method 300 advances to block 324 of FIG. 4, in which the persistence management compute device 190 may obtain predetermined (e.g., determined by a manufacturer, determined at boot time of the resource, etc.) reliability factors (e.g., data, such as a numeric value, indicative of a reliability of each corresponding resource) for resources for each logical domain.

Figure 4:
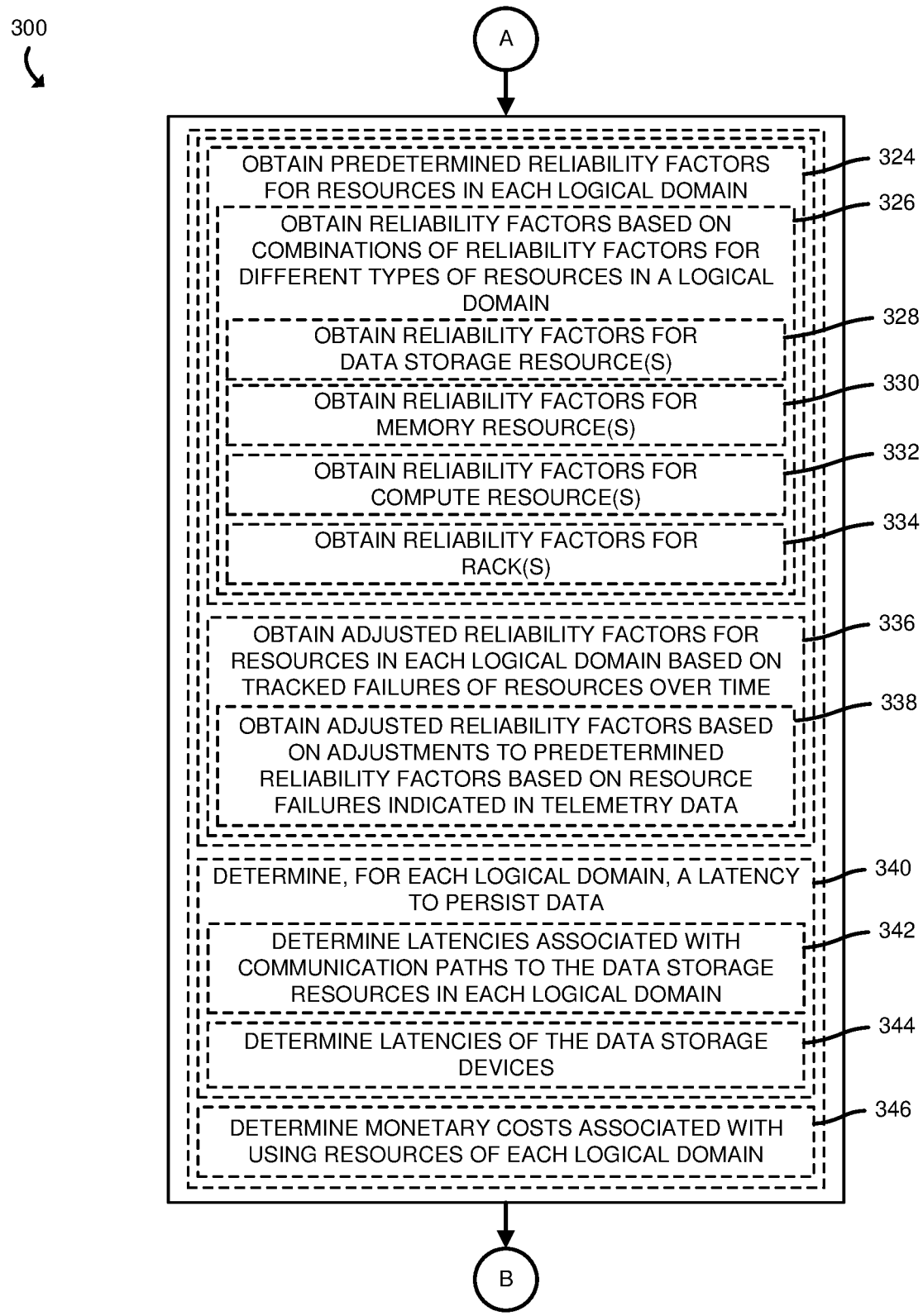

Referring now to FIG. 4, in block 326, the persistence management compute device 190 may obtain reliability factors for different types of resources in a logical domain. In doing so, the persistence management compute device 190 may obtain reliability factors for data storage resources, as indicated in block 328. Additionally, the persistence management compute device 190 may obtain reliability factors for memory resources, as indicated in block 330. Further, the persistence management compute device 190 may obtain reliability factors for compute resources (e.g., compute devices that operate a software stack of a distributed storage system, such as Ceph), as indicated in block 332. Additionally the persistence management compute device 190 may obtain reliability factors for racks (e.g., indicative of how often power to the rack is interrupted), as indicated in block 334. Further, and as indicated in block 336, the persistence management compute device 190 may obtain adjusted reliability factors for resources in each logical domain based on tracked failures (e.g., malfunctions, periods of inaccessibility, etc.) of the resources over time (e.g., using telemetry data tracked by the failure monitor logic 710). In the illustrative embodiment, and as indicated in block 338, the persistence management compute device 190 obtains adjusted reliability factors based on adjustments to predetermined reliability factors (e.g., from block 324) based on resource failures indicated in telemetry data.

Still referring to FIG. 4, the persistence management compute device 190 may determine, for each logical domain, a latency to persist data (e.g., a period of time that elapses for data to be written to a data storage device), as indicated in block 340. As indicated in block 342, the persistence management compute device 190 may determine latencies associated with communication paths to the data storage resources in each logical domain. Additionally or alternatively, and as indicated in block 344, the persistence management compute device 190 may determine latencies of the data storage devices themselves (e.g., an amount of time that elapses for a particular data storage device to write or read a predefined amount of data, etc.). As indicated in block 346, the persistence management compute device 190 may determine monetary costs associated with using resources in each logical domain (e.g., by analyzing cost data reported to the register interface 702 of the persistence management logic unit 192). Subsequently, the method 300 advances to block 348 of FIG. 5, in which the persistence management compute device 190 receives, from a client compute device located at the edge (e.g., the client compute device 110), a request to persist (e.g., write to non-volatile memory) data.

Figure 5:
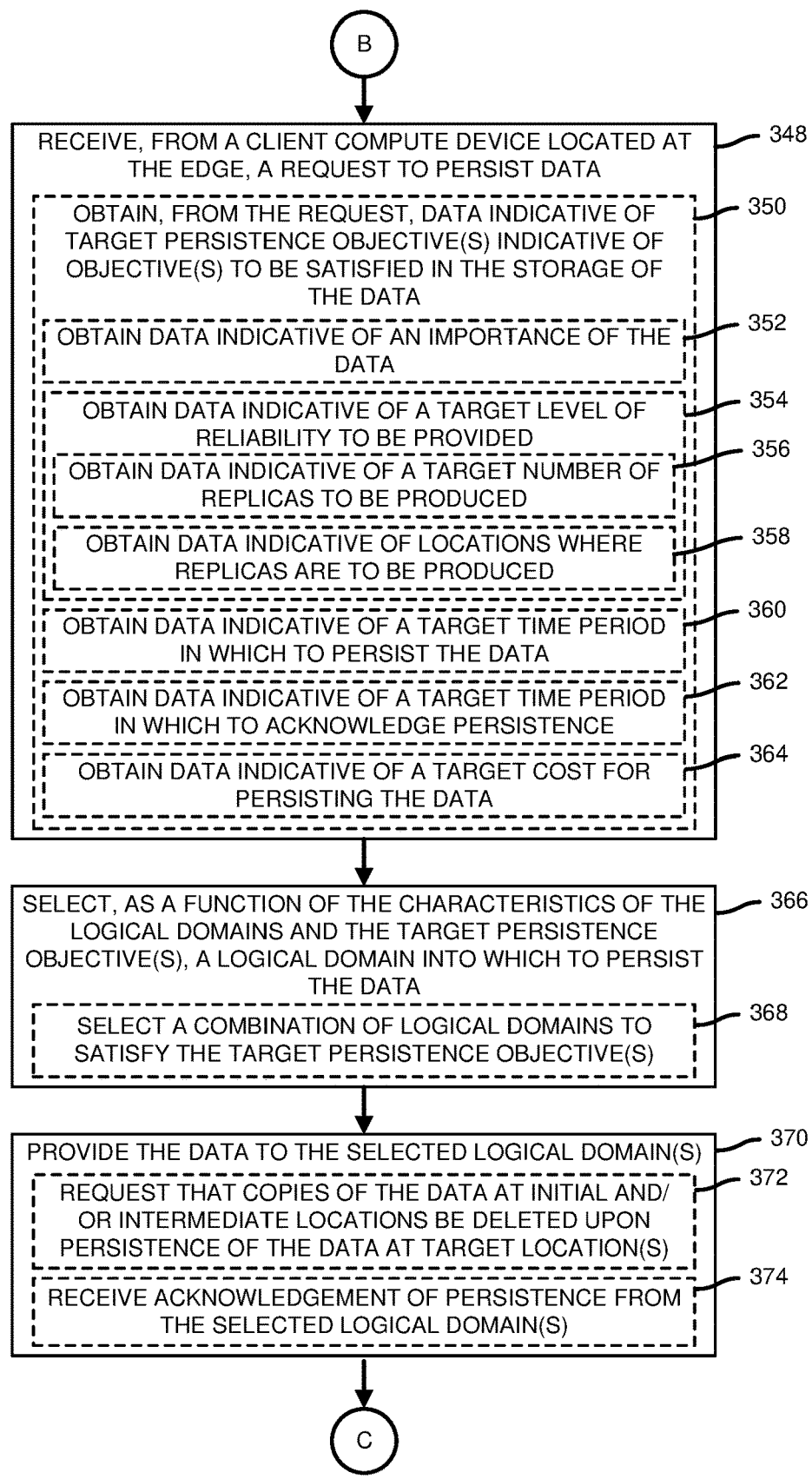

Referring now to FIG. 5, in receiving the request, the persistence management compute device 190, in the illustrative embodiment, obtains, from the request (e.g., as parameters), data indicative of target persistence objectives, as indicated in block 350. As described above, the target persistence objectives are embodied as objectives (e.g., reference thresholds) to be satisfied in the storage of the data. In block 352, the persistence management compute device 190 may obtain data indicative of an importance of the data. Similarly, the persistence management compute device 190 may obtain data indicative of a target level of reliability to be provided, as indicated in block 354. For example, and as indicated in block 356, the persistence management compute device 190 may obtain data indicative of a number of replicas to be produced and/or may obtain data indicative of locations where replicas are to be produced (e.g., at base stations, at the central office, etc.), as indicated in block 358. Additionally, the persistence management compute device 190 may obtain data indicative of a target time period in which to persist the data (e.g., a latency threshold), as indicated in block 360. Similarly, the persistence management compute device 190 may obtain data indicative of a target time period in which to acknowledge (e.g., confirm) persistence of the data to the client compute device 110, as indicated in block 362. For example, the persistence management compute device 190 may provide, to the client compute device 110, an acknowledgement that the data has been persisted even before the persistence management compute device 190 has received a call back from a destination resource where the data is to be stored, if the destination resource is associated with a high enough (e.g., to satisfy a predefined threshold) level of reliability (e.g., the persistence management compute device 190 may assume that the data will be stored successfully). Additionally, the persistence management compute device 190 may obtain data indicative of a target cost (e.g., a fraction of a dollar per megabyte) for persisting the data, as indicated in block 364.

Still referring to FIG. 5, the persistence management compute device 190, in the illustrative embodiment, selects, as a function of the characteristics of the logical domains 802, 804, 806, 808, 810, 812 (e.g., from block 306) and the target persistence objectives (e.g., from block 348), a logical domain into which to persist (e.g., store) the data, as indicated in block 366. In some embodiments, the persistence management compute device 190 may select a combination of logical domains (e.g., logical domains 802, 804) to satisfy the target persistence objectives (e.g., if a single logical domain does not satisfy the target performance objectives), as indicated in block 368. Subsequently, the persistence management compute device 190 provides the data (e.g., from the client compute device 110) to the selected logical domain(s), as indicated in block 370. In doing so, and as indicated in block 372, the persistence management compute device 190 may request that copies of the data at initial and/or intermediate locations along a path to a target location be deleted after the data has been persisted at the target location (e.g., at the core data center 182). As indicated in block 374, the persistence management compute device 190, in the illustrative embodiment, receives acknowledgement of persistence of the data (e.g., confirmation that the data was persisted) from the selected logical domain(s) (e.g., from the resources on which the data is to be persisted). Subsequently, the method 300 advances to block 376 of FIG. 6, in which the persistence management compute device 190 sends an acknowledgement of persistence of the data to the client compute device 110.

Figure 6:
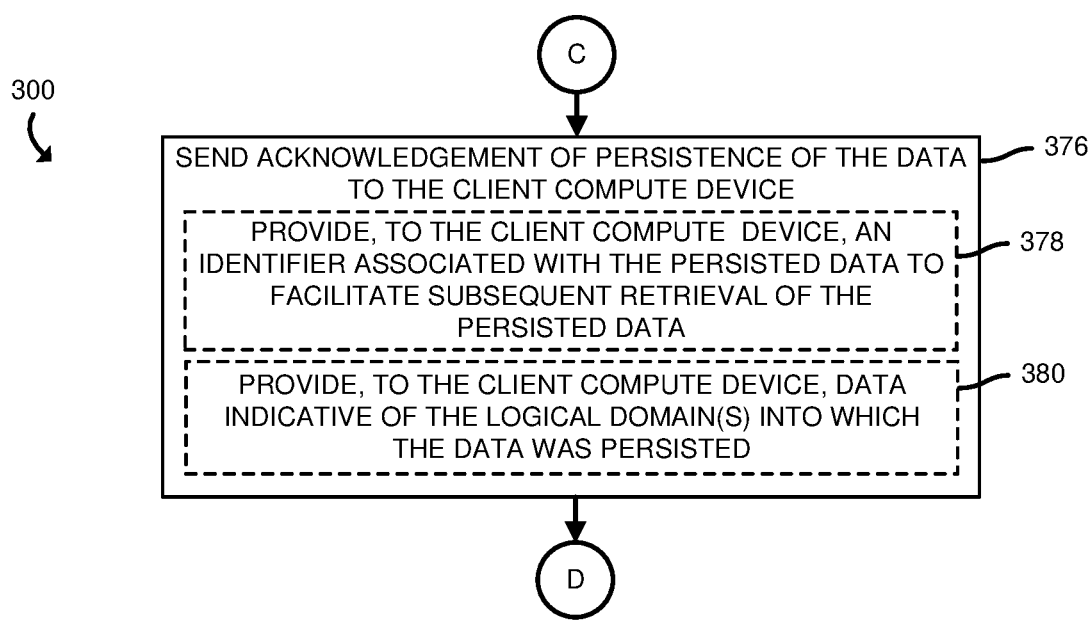

Referring now to FIG. 6, in sending the acknowledgement to the client compute device 110, the persistence management compute device 190, in the illustrative embodiment, provides, to the client compute device 110, an identifier associate with the persisted data to facilitate subsequent retrieval of the persisted data (e.g., an identifier to include in a subsequent request for the data), as indicated in block 378. As indicated in block 380, the persistence management compute device 190 may additionally provide, to the client compute device 110, data indicative of the logical domain(s) into which the data was persisted. Subsequently, the method 300 loops back to block 304 in which the persistence management compute device 190 again analyzes the characteristics of the resources in the logical domains (e.g., and potentially adjusts the allocation of resources to logical domains, such as reassigning a data storage resource from logical domain 802 to logical domain 804 in response to identifying a failure of the data storage resource in a set of telemetry data).

Referring briefly to FIG. 10, a MEC and fog network topology 1000 is shown. The network topology 1000 includes endpoints (at an endpoints/things network layer 1050), gateways (at a gateway layer 1040), access or edge computing nodes (e.g., at neighborhood nodes layer 1030), core network or routers (e.g., at a regional or central office layer 1020). A fog network (e.g., established at the gateway layer 1040) may represent a dense geographical distribution of near-user edge devices (e.g., fog nodes), equipped with storage capabilities (e.g., to avoid the need to store data in cloud data centers), communication capabilities (e.g., rather than routed over an internet backbone), control capabilities, configuration capabilities, measurement and management capabilities (rather than controlled primarily by network gateways such as those in an LTE core network), among others. In this context, FIG. 10 illustrates a general architecture that integrates a number of MEC and fog nodes—categorized in different layers (based on their position, connectivity and processing capabilities, etc.). It will be understood, however, that such fog nodes may be replaced or augmented by edge computing processing nodes.

Fog nodes may be categorized depending on the topology and the layer where they are located. In contrast, from a MEC standard perspective, each fog node may be considered as a mobile edge (ME) Host, or a simple entity hosting a ME app and a light-weighted ME Platform. In an example, a MEC or fog node may be defined as an application instance, connected to or running on a device (ME Host) that is hosting a ME Platform. As such, the application may consume MEC services and be associated to a ME Host in the system. The nodes may be migrated, associated to different ME Hosts, or consume MEC services from other (e.g., local or remote) ME platforms.

In contrast to using the edge, as described above, a traditional application may rely on remote cloud data storage and processing to exchange and coordinate information. A cloud data arrangement allows for long-term data collection and storage, but is not optimal for highly time varying data and may fail in attempting to meet latency challenges (e.g., stopping a vehicle when a child runs into the street). The use of the edge resources as described above enable providing services (e.g., access to data storage, execution of functions) in a low-latency manner (e.g., if requested), and, in some embodiments, may utilize features in existing MEC services that provide minimal overhead.

EXAMPLES

Illustrative examples of the technologies disclosed herein are provided below. An embodiment of the technologies may include any one or more, and any combination of, the examples described below.

Example 1 includes a device comprising circuitry to determine multiple different logical domains of data storage resources for use in storing data from a client compute device at an edge of a network, wherein each logical domain has a different set of characteristics; receive, from the client compute device, a request to persist data, wherein the request includes a target persistence objective indicative of an objective to be satisfied in the storage of the data; select, as a function of the characteristics of the logical domains and the target persistence objective, a logical domain into which to persist the data; and provide the data to the selected logical domain.

Example 2 includes the subject matter of Example 1, and wherein to determine multiple different logical domains comprises to determine a reliability characteristic for each logical domain.

Example 3 includes the subject matter of any of Examples 1 and 2, and wherein to determine a reliability characteristic for each domain comprises to determine a reliability of data storage media in each logical domain.

Example 4 includes the subject matter of any of Examples 1-3, and wherein to determine a reliability characteristic for each domain comprises to determine one or more error correction algorithms used in each logical domain.

Example 5 includes the subject matter of any of Examples 1-4, and wherein to determine multiple logical domains comprises to determine a data replication characteristic for each logical domain.

Example 6 includes the subject matter of any of Examples 1-5, and wherein to determine a data replication characteristic for each logical domain comprises to determine a number of replicas to be produced in each logical domain.

Example 7 includes the subject matter of any of Examples 1-6, and wherein to determine a data replication characteristic for each logical domain comprises to determine a number of replicas to be produced in each logical domain.

Example 8 includes the subject matter of any of Examples 1-7, and wherein to determine a data replication characteristic for each logical domain comprises to determine logical domains that provide replication among base stations.

Example 9 includes the subject matter of any of Examples 1-8, and wherein to determine a data replication characteristic for each logical domain comprises to determine logical domains that provide replication to a central office.

Example 10 includes the subject matter of any of Examples 1-9, and wherein to determine a reliability characteristic for each domain comprises to obtain a predefined reliability factor for resources in each logical domain.

Example 11 includes the subject matter of any of Examples 1-10, and wherein to obtain a predefined reliability factor for resources in each logical domain comprises to obtain a reliability factor based on a combination of reliability factors for different types of resources in each logical domain.

Example 12 includes the subject matter of any of Examples 1-11, and wherein to obtain a reliability factor based on a combination of reliability factors for different types of resources in each logical domain comprises to obtain a reliability factor for a data storage resource, a reliability factor for a memory resource, a reliability factor for a compute resource, and a reliability factor for a rack.

Example 13 includes the subject matter of any of Examples 1-12, and wherein to determine a reliability characteristic for each domain comprises to adjust a predefined reliability factor for a logical domain based on tracked failures of one or more resources in the logical domain.

Example 14 includes the subject matter of any of Examples 1-13, and wherein to determine multiple different logical domains comprises to determine, for each logical domain, a latency to persist data.

Example 15 includes the subject matter of any of Examples 1-14, and wherein the circuitry is further to determine a monetary cost associated with using one or more resources of each logical domain.

Example 16 includes the subject matter of any of Examples 1-15, and wherein to receive a request that includes a target persistence objective indicative of an objective to be satisfied in the storage of the data comprises to receive a request that includes data indicative of a target level of reliability to be provided, data indicative of a target time period in which to persist the data, or data indicative of a monetary cost for persisting the data.

Example 17 includes the subject matter of any of Examples 1-16, and wherein the circuitry is to select, as a function of the characteristics of the logical domains and the target persistence objective, a combination of logical domains into which to persist the data.

Example 18 includes a method comprising determining, by a device, multiple different logical domains of data storage resources for use in storing data from a client compute device at an edge of a network, wherein each logical domain has a different set of characteristics; receiving, by the device and from the client compute device, a request to persist data, wherein the request includes a target persistence objective indicative of an objective to be satisfied in the storage of the data; selecting, by the device and as a function of the characteristics of the logical domains and the target persistence objective, a logical domain into which to persist the data; and providing, by the device, the data to the selected logical domain.

Example 19 includes the subject matter of Example 18, and wherein determining multiple different logical domains comprises determining a reliability characteristic for each logical domain.

Example 20 includes one or more machine-readable storage media comprising a plurality of instructions stored thereon that, in response to being executed, cause a device to determine multiple different logical domains of data storage resources for use in storing data from a client compute device at an edge of a network, wherein each logical domain has a different set of characteristics; receive, from the client compute device, a request to persist data, wherein the request includes a target persistence objective indicative of an objective to be satisfied in the storage of the data; select, as a function of the characteristics of the logical domains and the target persistence objective, a logical domain into which to persist the data; and provide the data to the selected logical domain.

Example 21 includes one or more machine-readable storage media comprising a plurality of instructions stored thereon that, after being prepared for execution, cause a compute device that executes the prepared instructions to determine multiple different logical domains of data storage resources for use in storing data from a client compute device at an edge of a network, wherein each logical domain has a different set of characteristics; receive, from the client compute device, a request to persist data, wherein the request includes a target persistence objective indicative of an objective to be satisfied in the storage of the data; select, as a function of the characteristics of the logical domains and the target persistence objective, a logical domain into which to persist the data; and provide the data to the selected logical domain.

What is claimed is:

1. A device comprising:
   at least one memory;
   instructions in the device; and
   processor circuitry to execute the instructions to at least:
   analyze information about respective individual data storage resources at an edge of a network to determine respective individual reliability characteristics;
   define a first logical domain and a second logical domain, the first logical domain to be associated with a first domain reliability characteristic that is higher than a second domain reliability characteristic, the second domain reliability characteristic associated with the second logical domain;
   assign, based on the respective individual reliability characteristics of the respective individual data storage resources, a first set of the individual data storage resources to the first logical domain and a second set of the individual data storage resources to the second logical domain;
   reassign one or more of the first set of the individual data storage resources from the first logical domain to the second logical domain based on adjustments to corresponding ones of the individual reliability characteristics, the adjustments based on tracked failures of the one or more of the first set of the individual data storage resources;
   access a request from a client compute device to persist data, the request to include a target persistence objective to be satisfied in storage of the data;
   select, as a function of the first and second domain reliability characteristics of the respective first and second logical domains and the target persistence objective, at least one of the first and second logical domains in which to persist the data; and
   provide the data to the selected one of the at least one of the first and second logical-domains.

2. The device of claim 1, wherein the processor circuitry is to determine the first and second domain reliability characteristics based on data storage media associated with respective ones of the individual data storage resources.

3. The device of claim 1, wherein to assign the first set and the second set of the individual data storage resources to the respective ones of the first and second logical domains, the processor circuitry is to identify one or more error correction algorithms used by the individual data storage resources in the first and second sets of data storage resources.

4. The device of claim 1, wherein to assign the first set of the individual data storage resources to the first logical domain and the second set of the individual data storage resources to the second logical domain, the processor circuitry is to determine respective data replication characteristics for the respective ones of the first and second logical domains.

5. The device of claim 4, wherein to determine the respective data replication-characteristics for the respective ones of the first and second logical domains, the processor circuitry is to determine a respective number of replicas to be produced in the respective ones of the first and second logical domains.

6. The device of claim 4, wherein to determine the respective data replication characteristics for the respective ones of the first and second logical domains, the processor circuitry is to determine whether any of the first or second logical domains provide replication among base stations.

7. The device of claim 4, wherein to determine the respective data replication-characteristics for the respective ones of the first and second logical domains, the processor circuitry is to identify the ones of the first and second logical domains that provide data replication to a central office.

8. The device of claim 1, wherein to determine the respective domain reliability characteristics for the respective ones of the first and second logical domains, the processor circuitry is to obtain respective predefined reliability factors for the respective ones of the first and second sets of individual data storage resources.

9. The device of claim 8, wherein to obtain the respective predefined reliability factors for the respective ones of the first and second sets of individual data storage resources, the processor circuitry is to use a combination of individual predefined reliability factors associated with different types of the individual data storage resources included in the respective ones of the first and second sets of individual data storage resources.

10. The device of claim 9, wherein the different types of the individual data storage resources include at least one of a data storage device, a memory resource, a compute resource or a rack.

11. The device of claim 1, wherein the processor circuitry is to assign the respective first and second sets of the individual data storage resources to the respective first and second logical domains, based, at least in part, on individual latencies of the individual data storage resources in the first and second sets of the individual data storage resources.

12. The device of claim 1, wherein the processor circuitry is to determine a first monetary cost associated with using one or more of the individual data storage resources included in the first set of individual data storage resources and a second monetary cost associated with using one or more of the individual data storage resources included in the second set of the individual data storage resources.

13. The device of claim 1, wherein to satisfy the request that includes the target persistence objective, the processor circuitry is to access information including at least one of 1) a target level of reliability to be provided, 2) a target time period in which to persist the data, or 3) a monetary cost for persisting the data.

14. The device of claim 1, wherein the processor circuitry is to select a combination of at least some of data the individual storage resources in the first set of data storage resources and at least some of the individual data storage resources in the second set of the individual data storage resources in which to persist the data.

15. A method comprising:
    determining, by executing an instruction with at least one processor of a device, multiple logical domains of data storage resources at an edge of a network, ones of the multiple logical domains associated with reliability characteristics, the multiple logical domains determined by assigning ones of the data storage resources to respective ones of the multiple logical domains, the assigning based on respective individual reliability characteristics of the respective ones of the data storage resources, at least one of the multiple logical domains associated with a higher reliability characteristic than others of the multiple logical domains;
    reassigning one or more of the data storage resources of a first one of the multiple logical domains to a second one of the multiple logical domains based on adjustments to corresponding ones of the individual reliability characteristics, the adjustments based on tracked failures of the one or more of the data storage resources;

accessing, by executing an instruction with the at least one processor of the device, include a target persistence objective to be satisfied in storage of the data;

selecting, by executing an instruction with the at least one processor of the device, at least one of the logical domains in which to persist the data, the selecting based on a function of the reliability characteristics of the multiple logical domains and the target persistence objective; and providing, by executing an instruction with the at least one processor of the device, the data to the at least one of the logical-domains.

16. The method of claim 15, further including determining data replication characteristics for the ones of the multiple logical domains, the determining of the data replication characteristics including determining at least one of: (a) a number of replicas to be produced in the ones of the multiple logical domains; (b) the ones of the logical domains that provide replication among base stations; or (c) the ones of the multiple logical domains that provide replication to a central office.

17. One or more data storage devices comprising instructions that, in response to being executed, cause a processor device to at least:

assign respective data storage resources at an edge of a network to respective logical domains based on individual reliability characteristics of the data storage resources, the respective logical domains associated with respective domain reliability characteristics and at least one of the logical domains associated with a higher domain reliability characteristic than others of the logical domains;

reassign one or more of the data storage resources from a first one of the logical domains to a second one of the logical domains based on adjustments to corresponding ones of the individual reliability characteristics, the adjustments based on tracked failures of the one or more of the data storage resources;

access a request to persist data, the request to include a target persistence objective to be satisfied in storage of the data;

select, as a function of the respective domain reliability characteristics of the respective logical domains and the target persistence objective, at least one of the logical domains in which to persist the data; and provide the data to the at least one of the logical-domains.

18. The one or more data storage devices of claim 17, wherein the instructions are to cause the processor device to determine the domain reliability characteristics for the ones of the logical domains by determining a reliability of data storage media in the ones of the logical domains.

19. The one or more data storage devices of claim 17, wherein the instructions are to cause the processor device to determine the domain reliability characteristics for the ones of the logical domains by determining one or more error correction algorithms used in the ones of the logical domains.

20. The one or more data storage devices of claim 17, wherein the instructions are to cause the processor device to assign the respective data storage resource to the respective logical domains based on data replication characteristics associated with the ones of the logical domains.

21. The one or more data storage devices of claim 20, wherein the instructions are to cause the processor device to determine the data replication characteristics associated with the ones of the logical domains by determining a number of data replicas to be produced in the ones of the logical domains.

22. The one or more data storage devices of claim 20, wherein the instructions are to cause the processor device to determine the data replication characteristics for the ones of the logical domains by determining the ones of the logical domains that provide replication among base stations.

23. The one or more data storage devices of claim 20, wherein the instructions are to cause the processor device to determine the data replication characteristics associated with the ones of the logical domains by determining the ones of the logical domains that provide replication to a central office.

24. The one or more data storage devices of claim 17, wherein the instructions are to cause the processor device to determine the domain reliability characteristics for the ones of the logical domains by obtaining predefined reliability factors for the data storage resources in the ones of the logical domains.

25. The one or more data storage devices of claim 24, wherein the instructions are to cause the processor device to obtain the predefined reliability factors for the data storage resources in the ones of the logical domains by obtaining a combination of reliability factors, at least some of the reliability factors corresponding to different types of the data storage resources in the ones of the logical domains.

26. The one or more data storage devices of claim 25, wherein the instructions are to cause the processor device to obtain the combination of the reliability factors for the different types of data storage resources in the ones of the logical domains by obtaining at least one of a first one of the combination of reliability factors for a data storage resource, a second one of the combination of reliability factors for a memory resource, a third one of the combination of reliability factors for a compute resource, or a fourth one of the combination of reliability factors for a rack.

27. The one or more data storage devices of claim 17, wherein the instructions are to cause the processor device to assign the respective data storage resources to the respective logical domains by determining, for the ones of the logical domains, latencies to persist the data.

28. The one or more data storage devices of claim 17, wherein the instructions are to cause the processor device to determine a monetary cost associated with using one or more of the data storage resources of the ones of the logical domains.

29. The one or more data storage devices of claim 17, wherein the instructions are to cause the processor device to access at least one of a target level of reliability to be provided, a target time period in which to persist the data, or a monetary cost for persisting the data corresponding to the request.

30. The one or more data storage devices of claim 17, wherein the instructions are to cause the processor device to select, based on the domain reliability characteristics of the logical domains and the target persistence objective, a combination of the logical domains in which to persist the data.

* * * * *